United States Patent
Curtin et al.

(10) Patent No.: US 9,942,133 B2
(45) Date of Patent: Apr. 10, 2018

(54) FULLY CONNECTED NETWORK

(71) Applicant: Tektronix Texas, Inc., Westford, MA (US)

(72) Inventors: John P. Curtin, Richardson, TX (US); James Hall, New York, NY (US)

(73) Assignee: NetScout Systems Texas, LLC, Plano, TX (US)

(*) Notice: Subject to any disclaimer, the term of this patent is extended or adjusted under 35 U.S.C. 154(b) by 102 days.

(21) Appl. No.: 15/081,217

(22) Filed: Mar. 25, 2016

(65) Prior Publication Data

US 2017/0279707 A1    Sep. 28, 2017

(51) Int. Cl.

| | | |
|---|---|---|
| H04L 12/28 | (2006.01) | |
| H04L 12/709 | (2013.01) | |
| H04L 12/26 | (2006.01) | |
| H04L 12/733 | (2013.01) | |
| H04L 12/775 | (2013.01) | |
| H04L 12/721 | (2013.01) | |
| H04L 12/703 | (2013.01) | |
| H04L 12/933 | (2013.01) | |
| H04L 12/751 | (2013.01) | |

(52) U.S. Cl.
CPC ........ *H04L 45/245* (2013.01); *H04L 43/0811* (2013.01); *H04L 45/02* (2013.01); *H04L 45/122* (2013.01); *H04L 45/28* (2013.01); *H04L 45/58* (2013.01); *H04L 45/66* (2013.01); *H04L 49/1584* (2013.01)

(58) Field of Classification Search
None
See application file for complete search history.

(56) References Cited

U.S. PATENT DOCUMENTS

| | | | |
|---|---|---|---|
| 9,716,615 B1* | 7/2017 | Grosser | H04L 41/0654 |
| 2009/0285124 A1 | 11/2009 | Aguirre et al. | |
| 2010/0153575 A1* | 6/2010 | Liu | H04L 65/605 709/231 |
| 2012/0182872 A1* | 7/2012 | Wakumoto | H04L 45/245 370/235 |
| 2014/0254352 A1 | 9/2014 | Natarajan et al. | |
| 2017/0195177 A1* | 7/2017 | Farkas | H04L 41/0816 |

OTHER PUBLICATIONS

Extended European Search Report for European Patent Application No. 17162740.9, dated Aug. 30, 2017.

* cited by examiner

*Primary Examiner* — Otis L Thompson, Jr.
(74) *Attorney, Agent, or Firm* — Locke Lord LLP; Scott D. Wofsy; Christopher J. Capelli (57) ABSTRACT

A fully-connected mesh network includes a plurality of switches. A first switch receives a packet traveling through the mesh network from an external source node to an external destination node specified by the packet. A plurality of links, which are all included in a mesh link aggregation group (LAG), couple each possible pair of the switches by a respective single link. Each of the respective links is included individually in an individual LAG. Each of the switches is configured to receive a packet from another switch of the plurality of switches via only the mesh LAG, and each switch that receives a packet via the mesh LAG is configured to transmit the packet to another switch of the plurality of switches via only one of the individual LAGs. The packet travels to the destination node at most two hops across the plurality of switches.

11 Claims, 8 Drawing Sheets

FULLY CONNECTED NETWORK

FIELD OF THE INVENTION

The present technology relates to a fully-connected network and, more particularly, to methods and systems to provide a fault-tolerant, load-balanced, loop-free fully-connected network using layer 2 switches.

BACKGROUND OF THE INVENTION

A fault-tolerant network is designed so that the network can continue to be operational in the event of a failure of a component, even if at a reduced capacity. For example, when a link of a network fails, a fault-tolerant network can continue to operate without using the link. A load-balanced network is designed to balance traffic across different links of the network to evenly distribute the traffic across the links, which can provide an overall increase in available bandwidth and throughput. A loop-free network is designed to prevent network traffic from traveling in a loop without reaching its intended destination.

Conventionally, a fault-tolerant, load-balanced, and loop-free network is implemented using layer 3 switches and/or metadata associated with packets transmitted through the network. Layer 3 switches, relative to layer 2 switches, and the use of metadata, add cost in terms of financial cost, complexity, and processing time during operation that can affect data rates. Additionally, networks that use layer 2 switches and do not need to use metadata in association with packets would also benefit from fault-tolerant, load-balanced, and loop-free operation. Accordingly, there is a need to provide a network that is fault-tolerant, load balanced, and loop-free that can be implemented using layer 2 switches. Additionally, there is a need for such a network to route packets through the network using layer 2 information provided in the packets themselves without a need for metadata.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings. In accordance with a purpose of the illustrated embodiments, in one aspect, a fully-connected mesh network is provided that includes a plurality of switches. A first switch of the plurality of switches receives a packet traveling through the mesh network from a source node to a destination node specified by the packet, wherein the source node and destination node are external to the mesh network. A plurality of links couple each possible pair of the switches by a respective single link, wherein the plurality of links are all included in a mesh link aggregation group (LAG), each of the respective links is included individually in an individual LAG, each of the switches is configured to receive a packet from another switch of the plurality of switches via only the mesh LAG, and each switch that receives a packet via the mesh LAG is configured to transmit the packet to another switch of the plurality of switches via only one of the individual LAGs. The packet travels to the destination node at most two hops across the plurality of switches.

In accordance with another aspect of the disclosure, a method is provided for transmitting a packet through a fully-connected mesh network including a plurality of switches. The method includes receiving at a first switch of the plurality of switches a packet from a source node, the mesh network including a mesh link aggregation group (LAG) that includes a plurality of links that couple each possible pair of the switches by a respective single link, wherein each of the respective links is included individually in an individual LAG. The method further includes transmitting the packet to a destination node specified by the packet, the source and destination nodes being external to the mesh network. Transmitting the packet includes transmitting the packet to a second switch of the plurality of switches via the mesh LAG, wherein each of the switches can receive a packet from another switch of the plurality of switches via only the mesh LAG, and transmitting the packet to a third switch of the plurality of switches via one of the individual LAGs. Each switch that receives a packet via the mesh LAG can transmit the packet to another switch of the plurality of switches via only one of the individual LAGs, wherein the packet travels to the destination node at most two hops across the plurality of switches.

In accordance with a further aspect of the disclosure, a plurality of switches of a network, are provided. Each switch includes a plurality of ports coupled to respective link of a first plurality of links. The respective links individually couple the switch to each of the other switches of the plurality of switches. The plurality of links form a fully-connected mesh network and are all included in a mesh link aggregation group (LAG), and each respective link of the plurality of links is included individually in an individual LAG. Each switch further includes a memory storing a plurality of executable instructions and a processing device that executes the executable instructions to perform operations. The operations include controlling the plurality of ports so that when a switch of the plurality of switches receives a packet, the packet enters the switch from the mesh network via only the mesh LAG and exits the switch via only one of the individual LAGs, wherein the packet travels at most two hops across the plurality of switches to a destination node that is external from the mesh network.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present disclosure is now described more fully with reference to the accompanying drawings, in which illustrated embodiments of the present disclosure is shown wherein like reference numerals identify like elements. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present disclosure is not entitled to antedate such publication by virtue of prior disclosure. Further, the dates of publication provided may differ from the actual publication dates which may need to be independently confirmed.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the disclosure based on the above-described embodiments. Accordingly, the disclosure is not to be limited by what has been particularly shown and described, except as indicated by the appended claims.

Figure 1:
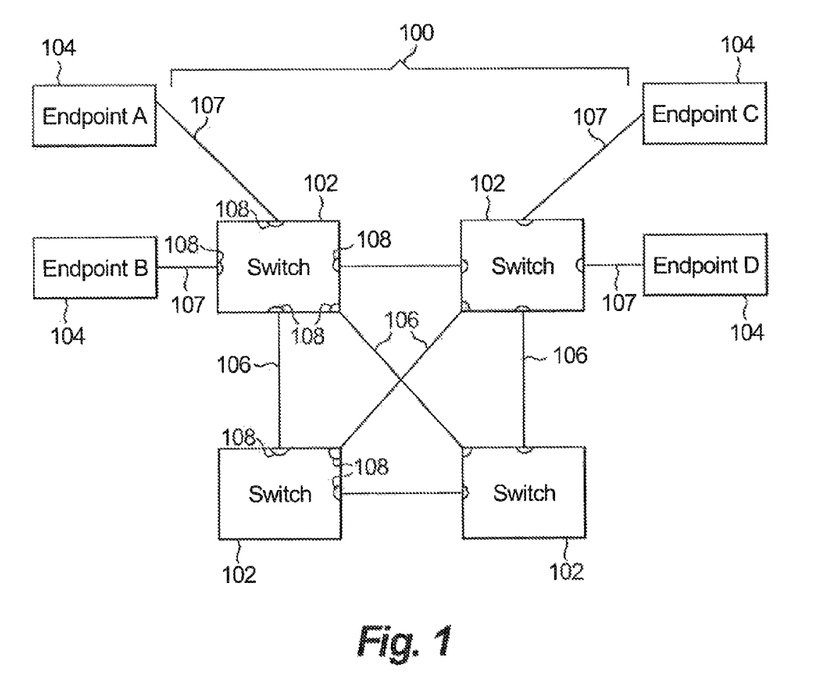
FIG. 1 illustrates a schematic diagram of a fully-connected network in accordance with an illustrative embodiment of the disclosure.

Description of certain illustrated embodiments of the present disclosure will now be provided. With reference now to FIG. 1, an exemplary fully-connected mesh network 100 is generally shown. Configured with a full mesh topology, the mesh network 100 includes a plurality of switches 102 that communicate with one another via links 106. The switches 102 further communicate with an unlimited number of endpoints 104 via links 107. The switches 102 each have ports 108 that interface the switch 102 with the respective links 106 and 107. While the mesh network 100 is shown with four switches 102, switch 102a-102d, the mesh network 100 can include N switches, wherein N≥2. Similarly, the any number of ports 108 can be provided per switch 102.

Rather than a hub-and-spoke structure, mesh network 100 uses a decentralized topology in which each switch 102 of the mesh network 100 can couple directly to at least two other nodes, e.g., switches 102 and/or endpoints 104, without any intervening nodes. Links 106 couple each possible pair of switches 102, each pair being coupled by a single bi-directional link 106, to form a fully-connected mesh. Data packets can be forwarded from one switch 102 to another switch 102, wherein such movement of a packet from one switch 102 to another switch 102 in the mesh network is referred to as a hop.

Implementation of the mesh topology includes assigning each link 106 to both a mesh link aggregation group (LAG) and an independent LAG. All of the links 106 are included in the mesh LAG, whereas each link 106 is included individually in an individual LAG, so that there is only one link 106 per individual LAG. Accordingly, each switch 102 includes N LAGs.

The mesh LAG is configured to determine a next hop destination of the data packet through the mesh using load balancing. For example, such a configuration can be achieved by configuring the mesh and independent LAGs in accordance with IEEE 802.3ad specifications. Each switch 102 can be a commercially available switch, such as an Ethernet switch, that is configured to support communication using IEEE 802.3ad. The switches 102 are capable of sending a packet at the data link layer (e.g., layer 2 and/or layer 2.5 of the Open Systems Interconnection (OSI)) to a destination node, wherein the destination node is identified in the packet, e.g., by a layer 2 or layer 2.5 field, such as a media access control (MAC) address, virtual local area network (VLAN) ID, or multiprotocol label switching (MPLS) related address.

The endpoints 104 are each devices coupled to the mesh network 100 that function as a source node to send packets or as a destination node to receive packets. When the endpoint 104 functions as a source node, the endpoint's address (e.g., MAC address) is included in the packet as the source address. The endpoint 104 can generate the packet, or forward a received packet to a next destination node. Similarly, when the endpoint 104 functions as a destination node, the endpoint's address (e.g., MAC address or VLAN ID) is included in the packet as the destination address.

The links 106 and 107 can be wired (e.g., copper or optical) or wireless links, including inter/intra-board traces between switch integrated circuits. The wireless links can be configured to transmit signals wirelessly, such as, and without limitation, radio, Bluetooth, infrared, IEEE 802.11 WLAN, microwave, and/or modulated laser light beam signals.

Figure 2:
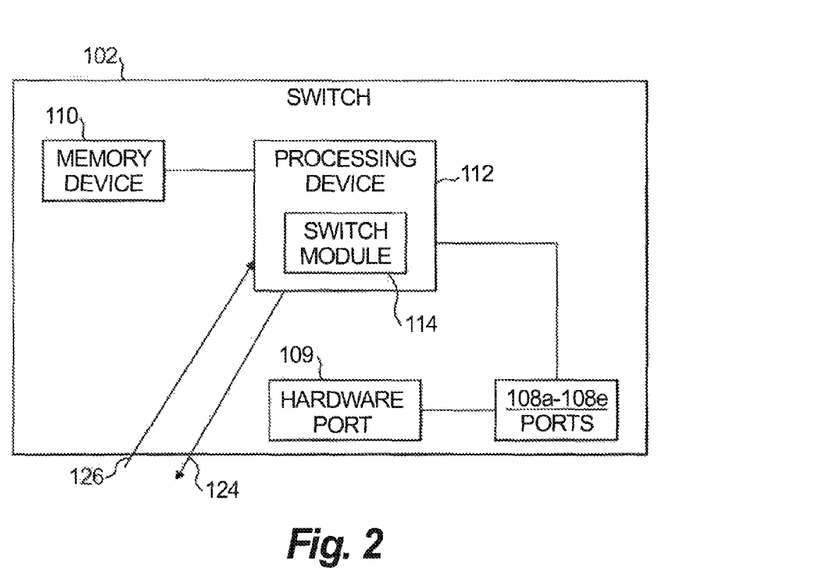
FIG. 2 illustrates a block diagram of a switch included in fully-connected network in accordance with an illustrative embodiment of the disclosure.

With additional reference to FIG. 2, each switch 102 can include a memory device 110 and a processing device 112. The memory device 110 stores executable instructions including a switch module 114 and program data. The processing device 112 executes the switch module 114 to perform operations in accordance with the disclosure.

The ports 108a-108e (referred to individually as port 108 or collectively as ports 108, with five ports shown for illustrative purposes only), as shown in FIG. 1, are configured to interface a switch's processing device 112 with an associated link 106. In the embodiment shown, the ports 108a-108e are virtual ports that use respective software port applications that share a hardware port 109. In other embodiments, each port 108a-108e can be a physical port that can connect with a physical link 106, such as a physical cable or device. The ports 108 can communicate with the switch's 102 processing device 112. When a packet is received at one of the ports 108a-108e via a coupled link 106, that port 108 transmits the packet, as instructed by the processing device 112, to another port 108 in order to move the packet toward its destination node. The other port 108 can be associated with the same switch 102 or a different switch 102.

The status of the links 106 can be monitored by the processing device 112 or by a hardware device, such as can be included in hardware port 109 associated with ports 108. For example, the switch 102 can execute a software development kit (SDK) that monitors the ports 108 and link status and outputs link status data 124. Link status data 124 that indicates the status of each link 106 connected to the ports 108 (the physical and/or virtual ports) of the switch 102 can be output as link status data 124. Additionally, the processing device 112 can control the ports 108 (physical and/or virtual ports) of the switch 102 using port control messages. The processing device 112 can receive port control instructions 126 from an external source that instruct the processing device 112 how to control the ports 108.

The switch module 114 is configured so that packets enter the switch 102 via only the mesh LAG, and specifically not via the individual LAG. This can be a default configuration such that when a packet enters a port 108 that is included in the mesh LAG, the packet is defined as entering the associated switch 102 via the mesh LAG. The switch module 114 can optionally be configured so that additional restrictions are applied. In addition, a packet that enters a switch 102 via the mesh LAG exits the switch 102 via only one of the individual LAGs. A packet that enters a switch 102 via a link that is not included in the mesh LAG exits the switch 102 via the mesh LAG. In accordance with this configuration, regardless of the destination node specified by the packet, the packet travels at most two hops across links 106 included in the mesh LAG to the specified destination node.

Figure 3:
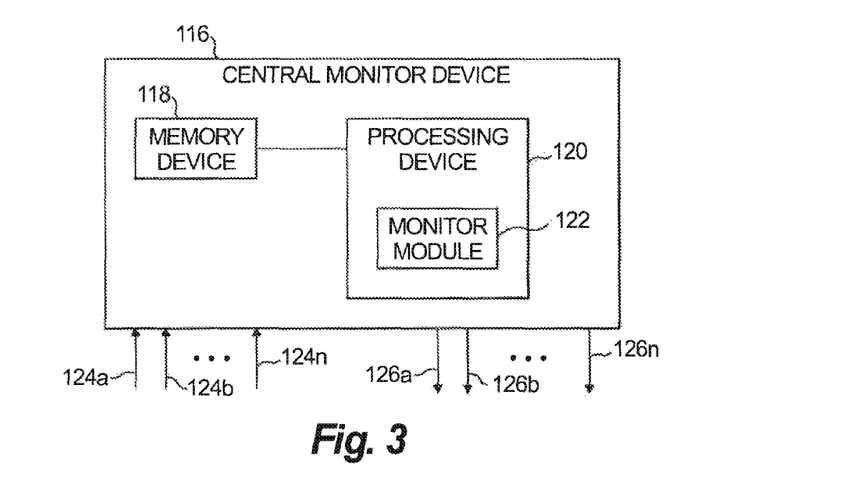
FIG. 3 illustrates a block diagram f a central monitor device coupled to the switches of the fully-connected network in accordance with an illustrative embodiment of the disclosure.

With additional reference to FIG. 3, a central monitor device 116 includes a memory device 118 and a processing device 120. The memory device 118 stores executable instructions including a monitor module 122 and program data. The processing device 120 executes the monitor module 122 to perform operations in accordance with the disclosure. The monitor module 122 receives link status data 124 from the switches 102 and outputs port control instructions 126 to the processing device 112 of the switches 102. In embodiments, the port control instructions 126 can directly control the ports 108.

Figure 4:
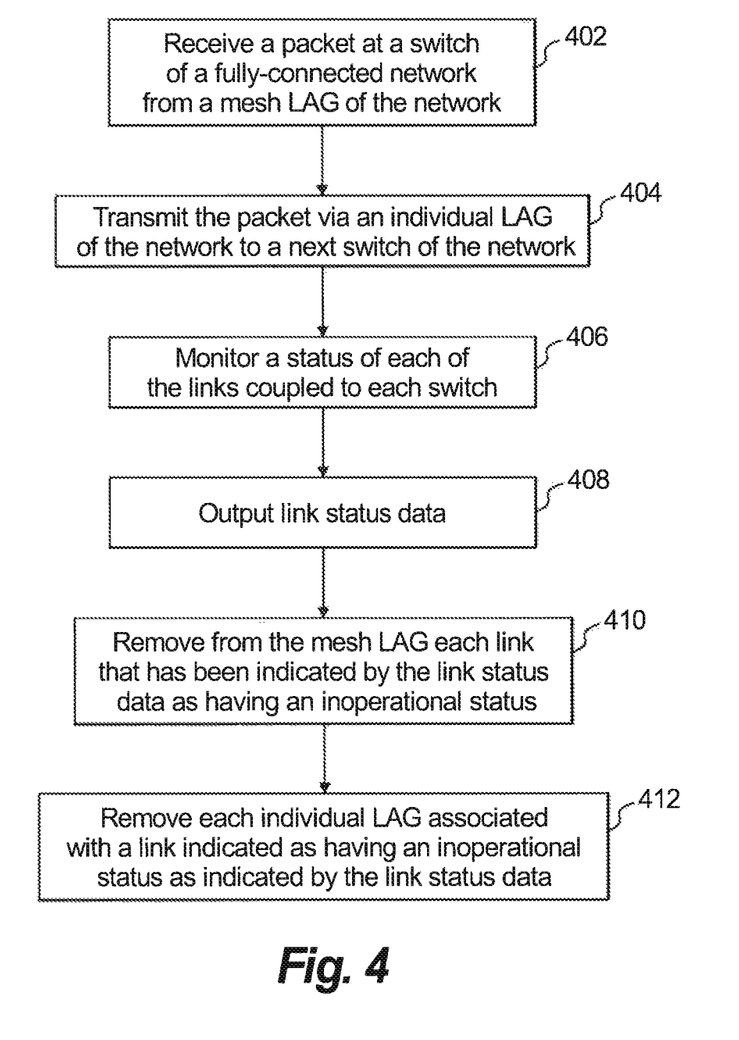
FIG. 4 illustrates a flowchart of operational steps of packet flow in the fully-connected network shown in FIG. 1, in accordance with an illustrative embodiment of the disclosure.

FIG. 4 is a flowchart of operational steps of switches 102 of FIG. 1, in accordance with exemplary embodiments of the present disclosure. Before turning to description of FIG. 4, it is noted that the flowchart in FIG. 4 shows example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

At operation 402, a packet is received at a switch 102 of a fully-connected network 100 from a mesh LAG of the network 100. The fully-connected network 100 includes a plurality of switches 102 and links 106, a mesh LAG, and individual LAGs, as shown and described in connection with FIGS. 1 and 2.

At operation 404, the packet is transmitted via an individual LAG of the network 100 to a next switch 102 of the network 100, wherein the next switch 102 is determined by the mesh LAG. The switch 102 is configured so that it can receive the packet via only the mesh LAG and transmit the packet to the next switch 102 via only the individual LAG selected by the mesh LAG. The packet travels at most two hops across the links 106 that are included in the mesh LAG to any destination node coupled to the network that is specified by the packet.

At operation 406, a status of each of the links coupled to each switch 102 is monitored. The monitoring can occur continually, at regular intervals, or in response to an event. At operation 408, link status data is output that indicates the status of the links is determined by the monitoring in operation 406. At operation 410, each link that has been indicated by the link status data as having an inoperational status is removed from the mesh LAG. At operation 412, each individual LAG associated with a link indicated as having an inoperational status as indicated by the link status data is removed.

FIGS. 5-8 show examples of a packet being transmitted through fully-connected network 100 from a source node to a destination node. In the examples, four switches 102a-102d and four endpoints 104a-104d are shown. A path traveled by each packet is indicated by arrows along links 106.

Figure 5:
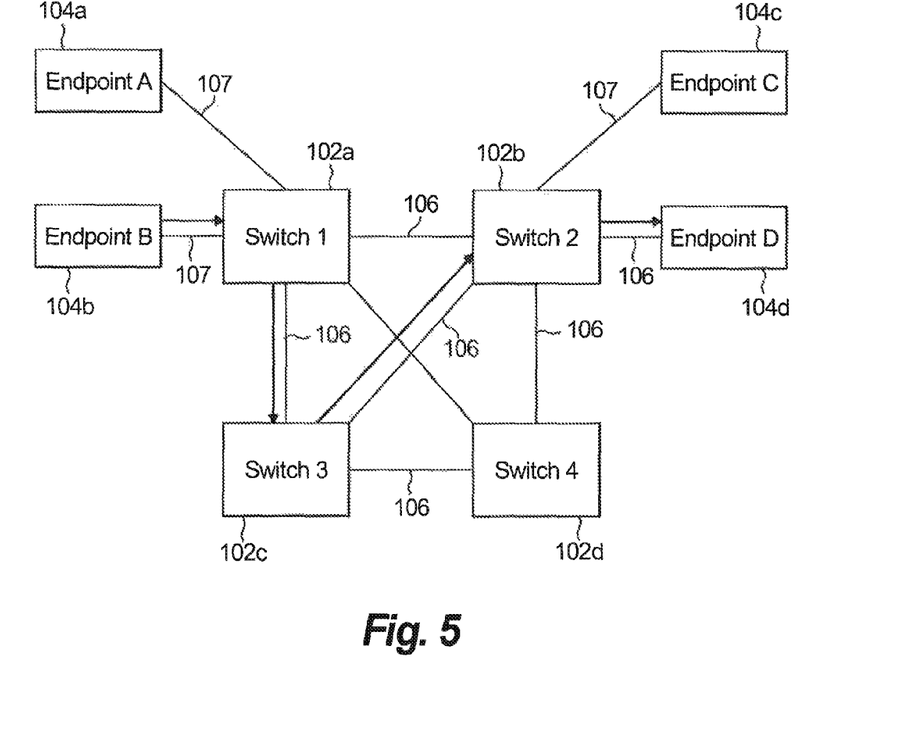
FIGS. 5-8 illustrate schematic diagrams of the fully-connected network of FIG. 1 showing examples of packet flow in the fully-connected network.

In an example shown in FIG. 5, a packet is transmitted from a source node endpoint 104b to switch 102a. The packet specifies the address of the source node and a destination node endpoint 104d. The packet is sent from the source node endpoint 104b to switch 102a via link 107, which does not belong to the mesh LAG or an individual LAG. The packet exits switch 102a via link 106 which is included in the mesh LAG, since the packet entered via communication link 107 that is not included in the mesh LAG. The packet travels a first hop to switch 102c. Switch 102c is selected using load-balancing (e.g., hashed load-balancing, without limitation thereto), and the individual LAG used for transmission is selected using layer 2 and/or layer 2.5 information, such as VLAN ID, MAC address, etc. In the example shown in FIG. 5, packets from endpoint 104b and destined for endpoint 104d are load-balanced among switches 102b, 102c, and 102d through the mesh LAG. Once the packets arrive at switch 102c, an individual LAG for reaching endpoint 104d is selected based on layer 2 and/or layer 2.5 information and the packet is directed to switch 102b, followed by endpoint 104d.

Each link 106 is included in the mesh LAG as well as its own individual LAG. The packet enters switch 102c by traversing the link 106 via the mesh LAG. Since the packet entered switch 102c via the mesh LAG, the packet must exit switch 102c via an individual LAG for its final destination within the mesh. Accordingly, the packet travels a second hop along link 106 via its individual LAG to switch 102b.

Once the packet arrives at switch 102*b* it is transmitted along a link 107 that is not included in any of the LAGs to endpoint 104*d*.

Figure 6:
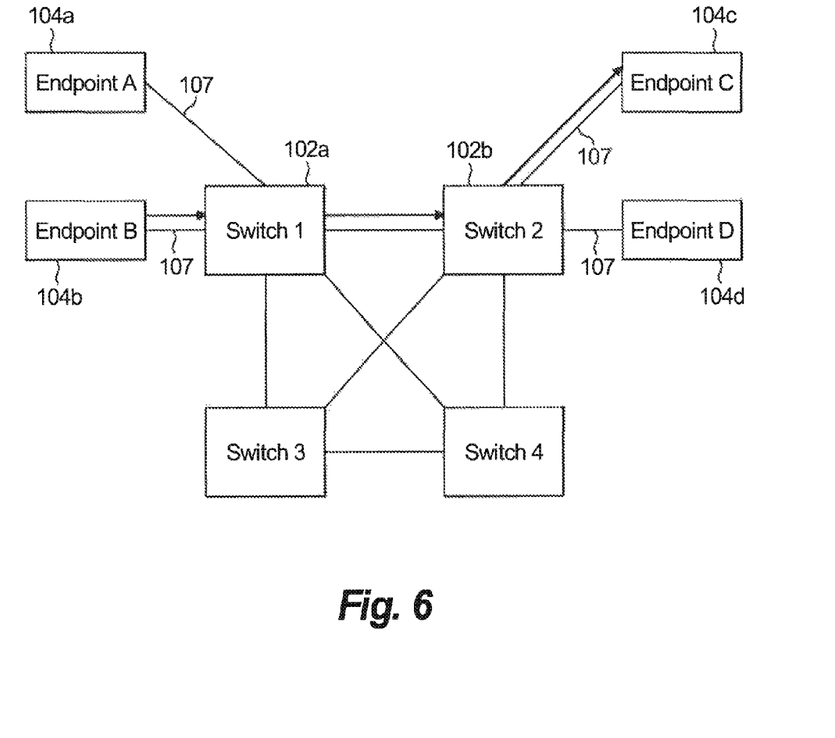

In an example shown in FIG. 6, a packet is transmitted from a source node endpoint 104*b* to switch 102*a*. The packet specifies the address of the source node and a destination node endpoint 104*c*. The packet is sent from the source node endpoint 104*b* to switch 102*a* via link 107, which does not belong to the mesh LAG or an individual LAG. The packet exits switch 102*a* via link 106 which is included in the mesh LAG. The packet travels a first hop to switch 102*b*, wherein switch 102*b* was selected using load-balancing.

The packet enters switch 102*b* by traversing the link 106 via the mesh LAG. Once the packet arrives at switch 102*b* it is transmitted along a link 107 that is not included in any of the LAGs to endpoint 104*c*.

Figure 7:
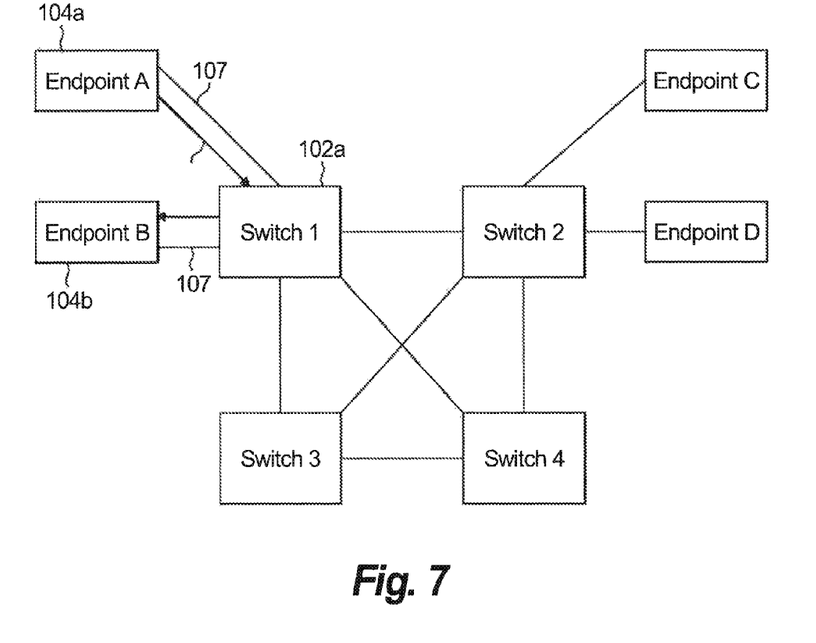

In an example shown in FIG. 7, a packet is transmitted from a source node endpoint 104*a* to switch 102*a*. The packet specifies the address of the source node and a destination node endpoint 104*b*. The packet is sent from the source node endpoint 104*a* to switch 102*a* via link 107, which does not belong to the mesh LAG or an individual LAG. The packet exits switch 102*a* via link 107 to endpoint 104*b* without entering the mesh LAG or an individual LAG.

Figure 8:
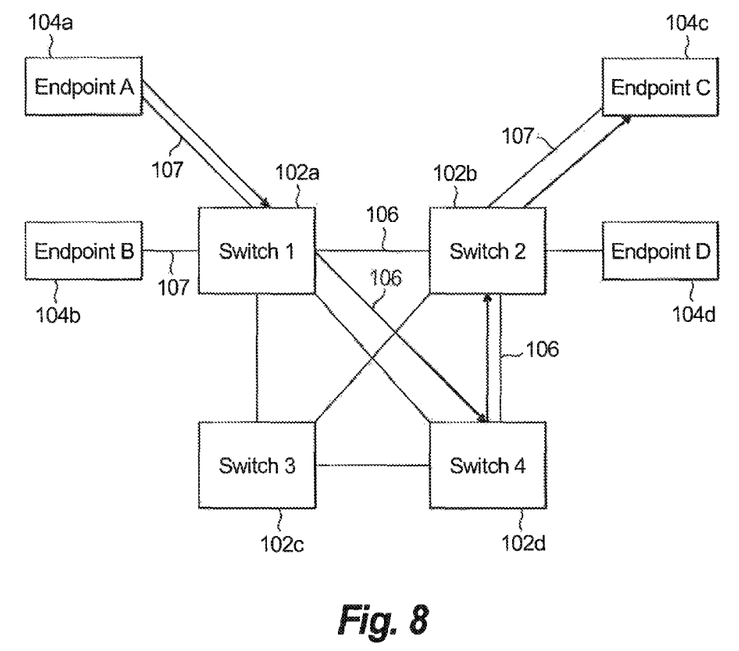

In an example shown in FIG. 8, a packet is transmitted from a source node endpoint 104*a* to switch 102*a*. The packet specifies the address of the source node and a destination node endpoint 104*c*. The packet is sent from the source node endpoint 104*a* to switch 102*a* via link 107, which does not belong to the mesh LAG or an individual LAG. The packet exits switch 102*a* via link 106 which is included in the mesh LAG. The packet travels a first hop to switch 102*d*. Switch 102*d* is selected using load-balancing. The load-balancing can use a random function, such as random hashing. Once the packet arrives at switch 102*d*, an individual LAG for reaching endpoint 104*c* is selected based on layer 2 and/or layer 2.5 information, such as VLAN ID, MAC address, etc., and the packet is directed to switch 102*b*, followed by endpoint 104*c*.

The packet enters switch 102*d* by traversing the link 106 via the mesh LAG. Since the packet entered switch 102*d* via the mesh LAG, the packet must exit switch 102*d* via an individual LAG that is selected by the mesh LAG based on load balancing criteria. The packet travels a second hop along link 106 via its individual LAG to switch 102*b*. Once the packet arrives at switch 102*b* it is transmitted along a link 107 that is not included in any of the LAGs to endpoint 104*c*.

Since the load-balancing used to select a switch 102 to "hop" to on the first hop, different packets having the same source and destination nodes may traverse the mesh using different routes, thus providing true "load balancing" of the network. The ability to select different routes also provides fault-tolerance to the mesh, since a route can be selected to avoid a node that is not operational.

Advantageously, the switches 102 use only layer 2 and/or layer 2.5 information from the packet, without using any additional data included in or associated with the packet. The monitoring provided by the individual switches 102 and the central monitor device 116 provides a fault-tolerant network that removes links that are not operational, while continuing operation using the viable links 106. The fully-connected network 100 is load-balanced as based on the next hop selections made by the mesh LAG. The fully-connected network 100 is loop-free based on the configuration of each link 106 belonging to the mesh LAG and its own individual LAG, wherein rules are enforced that requires that when a packet enters a switch 102 via the mesh LAG, it must exit via an individual LAG.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
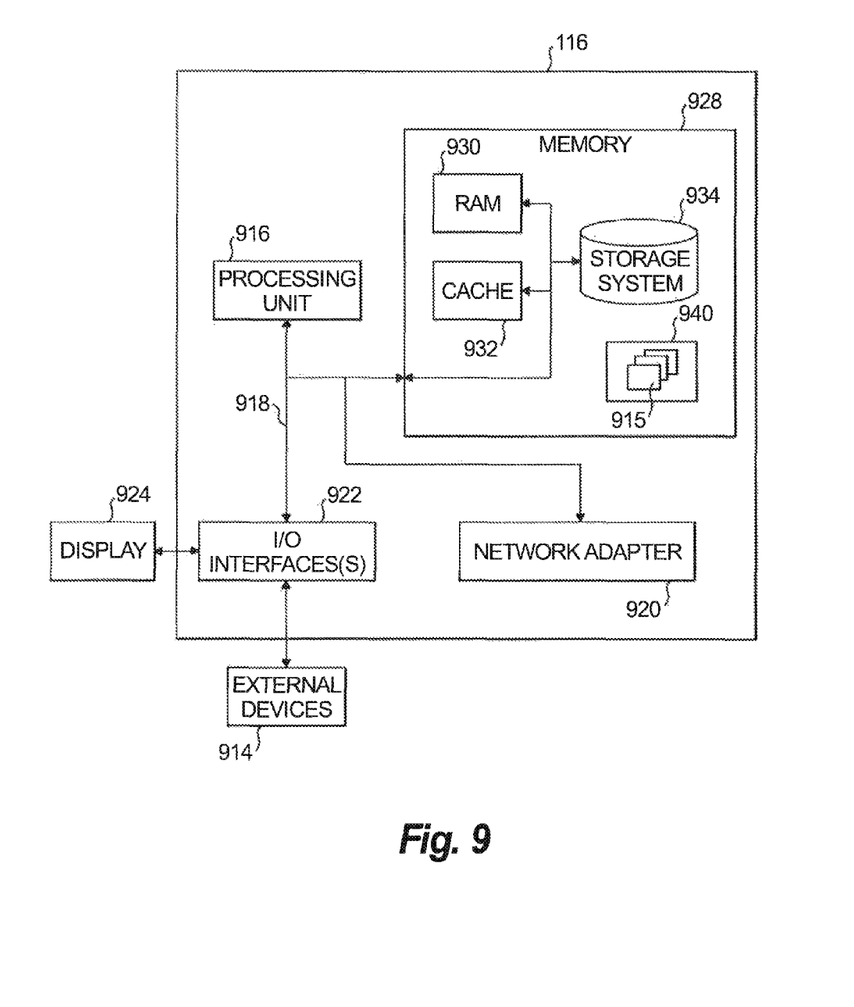
FIG. 9 illustrates a block diagram illustrating a typical central monitor device shown in FIG. 3 that may be employed to implement some or all processing functionality described herein, according to some embodiments of the disclosure.

Embodiments of network management system may be implemented or executed by centralized network management servers comprising one or more computer systems. One such network management server 104 is illustrated in FIG. 9. In various embodiments, network management server 104 may be a server, a mainframe computer system, a workstation, a network computer, a desktop computer, a laptop, or the like.

The central monitor device 116 is only one example of a suitable system and is not intended to suggest any limitation as to the scope of use or functionality of embodiments of the disclosure described herein. Regardless, the central monitor device 116 is capable of being implemented and/or performing any of the functionality set forth hereinabove.

The central monitor device 116 may be described in the general context of computer system-executable instructions, such as program modules, being executed by a computer system. Generally, program modules may include routines, programs, objects, components, logic, data structures, and so on that perform particular tasks or implement particular abstract data types. The central monitor device 116 may be practiced in distributed data processing environments where tasks are performed by remote processing devices that are linked through a communications network. In a distributed data processing environment, program modules may be located in both local and remote computer system storage media including memory storage devices.

The central monitor device 116 is shown in FIG. 9 in the form of a general-purpose computing device. The components of the central monitor device 116 may include, but are not limited to, one or more processors or processing units 916, a system memory 928, and a bus 918 that couples various system components including system memory 928 to processor 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The central monitor device 116 typically includes a variety of computer system readable media. Such media may be any available media that is accessible by the central monitor device 116 and it includes both volatile and non-volatile media, removable and non-removable media.

System memory 928 can include computer system readable media in the form of volatile memory, such as random access memory (RAM) 930 and/or cache memory 932. The central monitor device 116 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, memory 928 may include at least one program product having a set (e.g., at least one) of program modules that are configured to carry out the functions of embodiments of the disclosure.

Program/utility 940, having a set (at least one) of program modules 915, such as NMS and GUI, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 915 generally carry out the functions and/or methodologies of embodiments of the disclosure as described herein.

The central monitor device 116 may also communicate with one or more external devices 914 such as a keyboard, a pointing device, a display 924, etc.; one or more devices that enable a user to interact with network management server 104; and/or any devices (e.g., network card, modem, etc.) that enable network management server 104 to communicate with one or more other computing devices. Such communication can occur via Input/Output (I/O) interfaces 922. Still yet, network management server 104 can communicate with one or more networks such as a local area network (LAN), a general wide area network (WAN), and/or a public network (e.g., the Internet) via network adapter 920. As depicted, network adapter 920 communicates with the other components of network management server 104 via bus 918. It should be understood that although not shown, other hardware and/or software components could be used in conjunction with network management server 104. Examples, include, but are not limited to: microcode, device drivers, redundant processing units, external disk drive arrays, RAID systems, tape drives, and data archival storage systems, etc.

In examples, the processing device 112 of switch 102 or the processing device 120 of the central monitor device 116 can be implemented using software executed by hardware, firmware, or only hardware. For example, processing device 112 or processing device 120 can be a microprocessor, field programmable gate array (FPGA), or an application-specific integrated circuit (ASIC) that is configured to perform the method of the disclosure. The memory device 110 of the switch 102 can be configured similar to 928 and further store switch module 114. The hardware port 109 can be a port such as an XAUI, 10baseT, or 1000baseX, without limitation thereto, that can connect to a communication link, such as an optical, electrical, inter-board trace, intra-board trace communication link.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A fully-connected mesh network comprising:
a plurality of switches, a first switch of the plurality of switches receiving a packet traveling through the mesh network from a source node to a destination node specified by the packet, the source node and destination node being external to the mesh network; and
a plurality of links coupling each possible pair of the switches by a respective single link, wherein the plurality of links are all included in a mesh link aggregation group (LAG), each of the respective links is included individually in an individual LAG, each of the switches is configured to receive a packet from another switch of the plurality of switches via only the mesh LAG, and each switch that receives a packet via the mesh LAG is configured to transmit the packet to another switch of the plurality of switches via only one of the individual LAGs, wherein the packet travels to the destination node at most two hops across the plurality of switches and wherein the packet is transmitted from the second switch of the plurality of switches to a third switch of the plurality of switches via one of the individual lags, the third switch being determined using layer 2 and 2.5 information in the packet representing the destination node, the packet being transmitted to the destination node from the third switch.

2. The network of claim 1, wherein each of the plurality of switches monitors a status of each of the links that are coupled to the switch and outputs link status data that indicates the statuses monitored, wherein the network further comprises a monitor including a processing device and a memory device storing programmable instructions that when executed by the processing device cause the processing device to perform operations including:
receiving the link status data; and
in response to receiving link status data that indicates a link of the plurality of links is not operational,
removing the link from the mesh LAG; and
removing the individual LAG associated with the link.

3. The network of claim 1, wherein the packet is transmitted from the first switch to a second switch via the mesh LAG, the second switch being selected using load-balancing.

4. The network of claim 1, wherein the plurality of switches are layer 2 switches that operate in accordance with the Ethernet standard.

5. The network of claim 1, wherein the plurality of switches operate in accordance with the 802.3ad specification.

6. The network of claim 1, wherein the second switch includes at least two virtual ports that couple respectively to the mesh LAG and one of the individual LAGs.

7. A method for transmitting a packet through a fully-connected mesh network including a plurality of switches, the method comprising:
receiving at a first switch of the plurality of switches a packet from a source node, the mesh network including a mesh link aggregation group (LAG) that includes a plurality of links that couple each possible pair of the switches by a respective single link, each of the respective links being included individually in an individual LAG;
transmitting the packet to a destination node specified by the packet, the source and destination nodes being external to the mesh network, transmitting the packet comprising:
transmitting the packet to a second switch of the plurality of switches via the mesh LAG, wherein each of the switches can receive a packet from another switch of the plurality of switches via only the mesh LAG; and
transmitting the packet to a third switch of the plurality of switches via one of the individual LAGs, wherein each switch that receives a packet via the mesh LAG can transmit the packet to another switch of the plurality of switches via only one of the individual LAGs, wherein the packet travels to the destination node at most two hops across the plurality of switches wherein the third switch being determined using layer 2 and 2.5 information in the packet representing the destination node, the packet being transmitted to the destination node from the third switch.

8. The method of claim 7, further comprising:
monitoring a status of each of the plurality of links;
outputting link status data that indicates respective statuses monitored;
removing each link from the mesh LAG having an inoperational status as indicated by the link status data; and
removing an individual LAG associated with each link having an inoperational status as indicated by the link status data.

9. The method of claim 7, wherein the second switch is selected using load-balancing.

10. The method of claim 7, wherein the plurality of switches are layer 2 switches that operate in accordance with the Ethernet standard.

11. The method of claim 7, wherein the plurality of switches operate in accordance with the 802.3ad specification.

* * * * *